US012252233B2

United States Patent
Potier et al.

(10) Patent No.: US 12,252,233 B2
(45) Date of Patent: Mar. 18, 2025

(54) RUNAWAY EMERGENCY ACTUATOR BRAKE

(71) Applicant: Goodrich Actuation Systems SAS, Vernon (FR)

(72) Inventors: Karl Potier, Paris (FR); Raphael Medina, Pierrefitte sur Seine (FR)

(73) Assignee: GOODRICH ACTUATION SYSTEMS SAS, Saint-Marcel (FR)

( * ) Notice: Subject to any disclaimer, the term of this patent is extended or adjusted under 35 U.S.C. 154(b) by 15 days.

(21) Appl. No.: 18/185,539

(22) Filed: Mar. 17, 2023

(65) Prior Publication Data

US 2023/0322365 A1    Oct. 12, 2023

(30) Foreign Application Priority Data

Apr. 6, 2022  (EP) ..................................... 22305463

(51) Int. Cl.
| | | |
|---|---|---|
| F16D 41/02 | (2006.01) | |
| B64C 13/28 | (2006.01) | |
| F16D 27/10 | (2006.01) | |
| F16D 48/06 | (2006.01) | |
| B64C 13/34 | (2006.01) | |
| F16D 121/18 | (2012.01) | |

(52) U.S. Cl.
CPC .............. B64C 13/28 (2013.01); F16D 27/10 (2013.01); F16D 41/02 (2013.01); F16D 48/064 (2013.01); B64C 13/34 (2013.01); F16D 2121/18 (2013.01)

(58) Field of Classification Search
CPC ....... B64C 13/34; F16D 48/064; F16D 27/10; F16D 41/08
See application file for complete search history.

(56) References Cited

U.S. PATENT DOCUMENTS

| | | | |
|---|---|---|---|
| 4,762,205 A | 8/1988 | Ortman | |
| 5,582,390 A | 12/1996 | Russ | |
| 6,109,415 A | 8/2000 | Morgan et al. | |
| 8,146,858 B2 | 4/2012 | Port-Robach et al. | |
| 9,038,944 B2 | 5/2015 | Senegas et al. | |
| 10,035,585 B2 | 7/2018 | Schwartz | |
| 10,344,840 B2 | 7/2019 | Vermande | |
| 10,451,122 B2* | 10/2019 | Campton | F16D 41/14 |
| 10,520,070 B2 | 12/2019 | Turpin et al. | |
| 10,655,692 B2 | 5/2020 | Trybula | |
| 2004/0040813 A1 | 3/2004 | Darby et al. | |
| 2017/0088252 A1 | 3/2017 | Chavignier et al. | |
| 2019/0330032 A1* | 10/2019 | Perrin | H01H 3/3005 |
| 2022/0185448 A1* | 6/2022 | Rozeboom | B64C 5/16 |

FOREIGN PATENT DOCUMENTS

| | | | |
|---|---|---|---|
| EP | 0960811 A2 | 12/1999 | |
| EP | 0960811 A3 | 3/2000 | |

OTHER PUBLICATIONS

European Search Report for Application No. 22305463.6, mailed Sep. 20, 2022, 6 pages.

* cited by examiner

*Primary Examiner* — Stacey A Fluhart
(74) *Attorney, Agent, or Firm* — CANTOR COLBURN LLP (57) ABSTRACT

A system includes an electrically-actuated clutch arranged to selectively connect a shaft to a motor shaft. Ratchets brake the shaft against rotation in either direction when the output is not within either of the predetermined ranges. Thus, when the motor shaft is connected, via the clutch, to the shaft, the ratchets may act as a brake on the motor shaft.

11 Claims, 6 Drawing Sheets

RUNAWAY EMERGENCY ACTUATOR BRAKE

CROSS-REFERENCE TO RELATED APPLICATIONS

This application claims priority to European Patent Application No. 22305463.6 filed Apr. 6, 2022, the entire contents of which is incorporated herein by reference.

TECHNICAL FIELD

The present disclosure relates to an actuator having ratchets for braking.

BACKGROUND

Aircraft actuators are widely used for driving spoilers, flaps, flight surfaces, and slats of an aircraft. The actuator drives the spoiler to a desired position to affect the airflow around the aircraft in a desired manner, e.g. to brake the aircraft or change the lift. Such spoilers can be subject to large aerodynamic loads from the air flowing around the spoiler and these large forces can feed back to the actuator and cause it to move in an undesired manner. It is desirable to provide an emergency brake to brake the actuator in such circumstances.

SUMMARY

According to a first aspect, there is provided an actuator comprising a motor shaft having an axis, an output arranged to rotate within an angular range of less than 360 degrees, wherein rotation of the motor shaft about the axis drives the output in rotation, a first ratchet comprising a first ratchet wheel and a first ratchet pawl, the first ratchet arranged such that, while the first ratchet pawl engages the first ratchet wheel, the first ratchet wheel is freely rotatable in a first direction and prevented from rotation in a second direction, opposite the first direction; a second ratchet comprising a second ratchet wheel and a second ratchet pawl, the second ratchet arranged such that, while the second ratchet pawl engages the second ratchet wheel, the second ratchet wheel is freely rotatable in the second direction and prevented from rotation in the first direction. The first and second ratchet wheels are mounted to a shaft. A first cam surface is connected to rotate with the output, wherein the first cam surface is arranged to disengage the first ratchet pawl from the first ratchet wheel when the output is within a first predetermined angular range, and to allow the first ratchet pawl to engage with the first ratchet wheel when the output is outside the first predetermined angular range; a second cam surface connected to rotate with the output, wherein the second cam surface is arranged to disengage the second ratchet pawl from the second ratchet wheel when the output is within a second predetermined angular range, and to allow the second pawl to engage with the second ratchet wheel when the output is outside the second predetermined angular range; and an electrically-actuated clutch arranged to selectively connect the shaft to the motor shaft.

The motor shaft may be connected to the output via a gearbox, e.g. an planetary or epicyclic gearbox.

The actuator may comprise a controller operable to order the output for rotation, and operable to control the electrically-actuated clutch, wherein the controller is configured to: detect a rotational speed of the output, and to engage the clutch to connect the shaft to the motor shaft if the detected rotation speed of the output is greater than an ordered rotational speed of the output by more than a predetermined amount.

The actuator may comprise an electromagnet, (e.g. a solenoid), wherein the controller is configured to control electrical power to the electromagnet in order to control the electrically-actuated clutch.

The shaft and the motor shaft may be coaxial with one another.

The actuator may comprise an end stop, wherein the end stop defines a first end and a second end of the angular range of the output.

The first predetermined range may extend from a position where the output is in contact with the end stop at the first end of the angular range of the output, and extend to a first intermediate position of the output between the two ends of the angular range.

Put another way, the first predetermined range may extend from a first end of the range of motion allowed to the output by the endstop, to a position between the first and second ends of the allowed range of motion of the output. Once the output is beyond the first intermediate position, away from the endstop, the first cam surface no longer prevents the first ratchet pawl from engaging the first ratchet wheel.

Similarly, the second predetermined range may extend from a position where the output is in contact with the end stop the second end of the angular range of the output, and extend to a second intermediate position of the output between the two ends of the angular range.

Put another way, the second predetermined range may extend from a second end of the range of motion allowed to the output by the endstop, to a position between the two ends of the allowed range of motion of the output. Once the output is beyond the second intermediate position, away from the endstop, the second cam surface no longer prevents the second ratchet pawl from engaging the second ratchet wheel.

The cam surfaces may be arranged such that, when the output is at an angular position between the first and second intermediate positions, the first ratchet pawl engages the first ratchet wheel and second ratchet pawl engages the second ratchet wheel.

Put another way, in this embodiment, the first predetermined range does not overlap the second predetermined range. This means that, when the output is between the first and second intermediate positions, both ratchet pawls engage their respective ratchet wheels. If the clutch is engaged in this position to connect the shaft to the motor shaft, the ratchets act to prevent rotation of the motor shaft in either direction.

According to another aspect, there is provided an aircraft comprising: an airframe; a spoiler movably mounted to the airframe; and the actuator of the first aspect mounted to the airframe, wherein the output is connected to the spoiler to control a position of the spoiler relative to the airframe.

According to a further aspect, there is provided a method of controlling the rotary actuator the first aspect, the method comprising detecting a speed of the output; determining whether the speed of the output is greater than an ordered speed by more than a predetermined amount; and, if so, actuating the electrically-actuated clutch to connect the shaft to the motor shaft.

BRIEF DESCRIPTION OF THE DRAWINGS

Certain embodiments of the present disclosure will now be described in greater detail by way of example only and with reference to the accompanying drawings in which.

DETAILED DESCRIPTION

Figure 1:
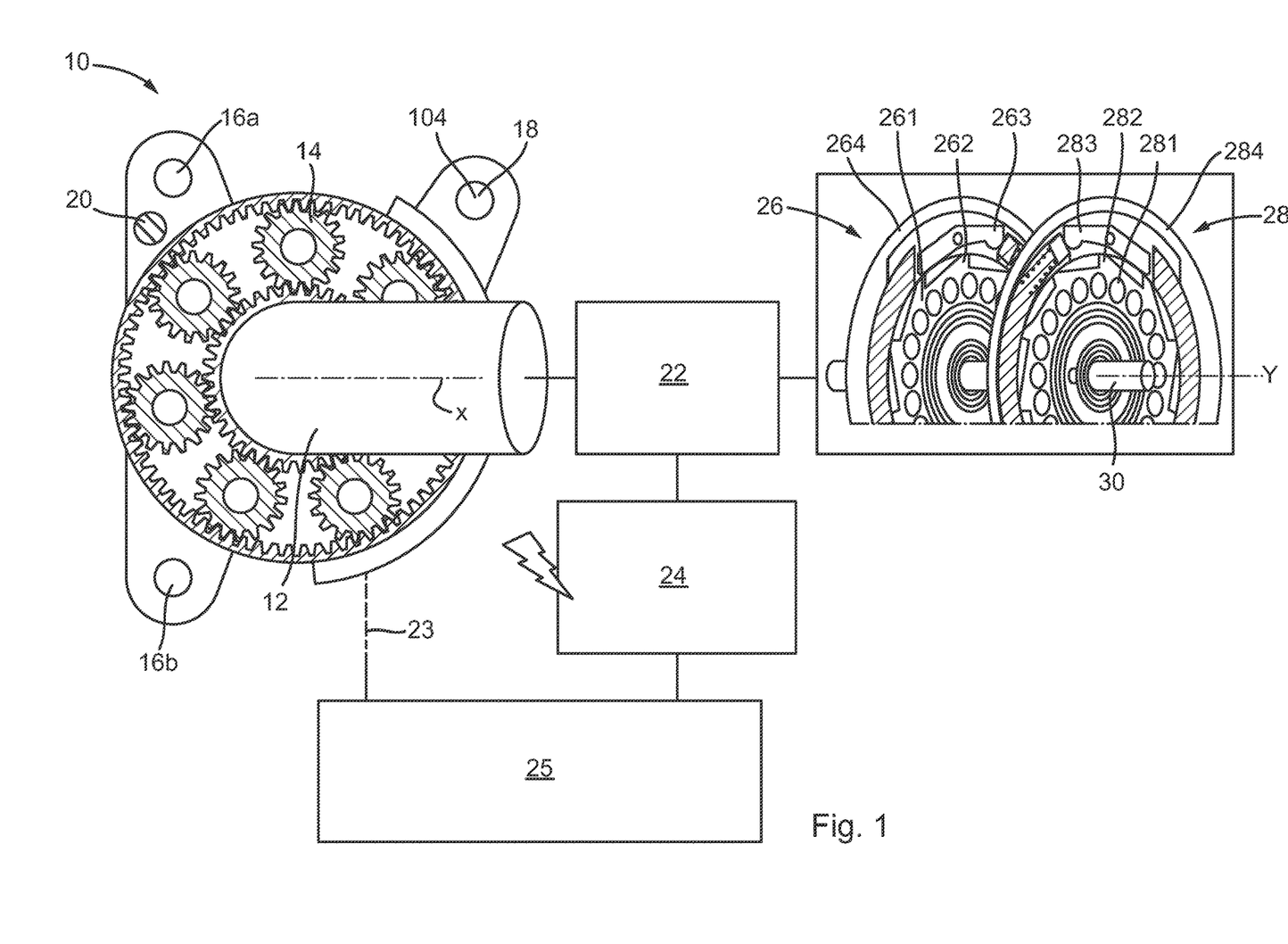
FIG. 1 shows an actuator having selective connection to a pair of ratchets.
Figure 4:
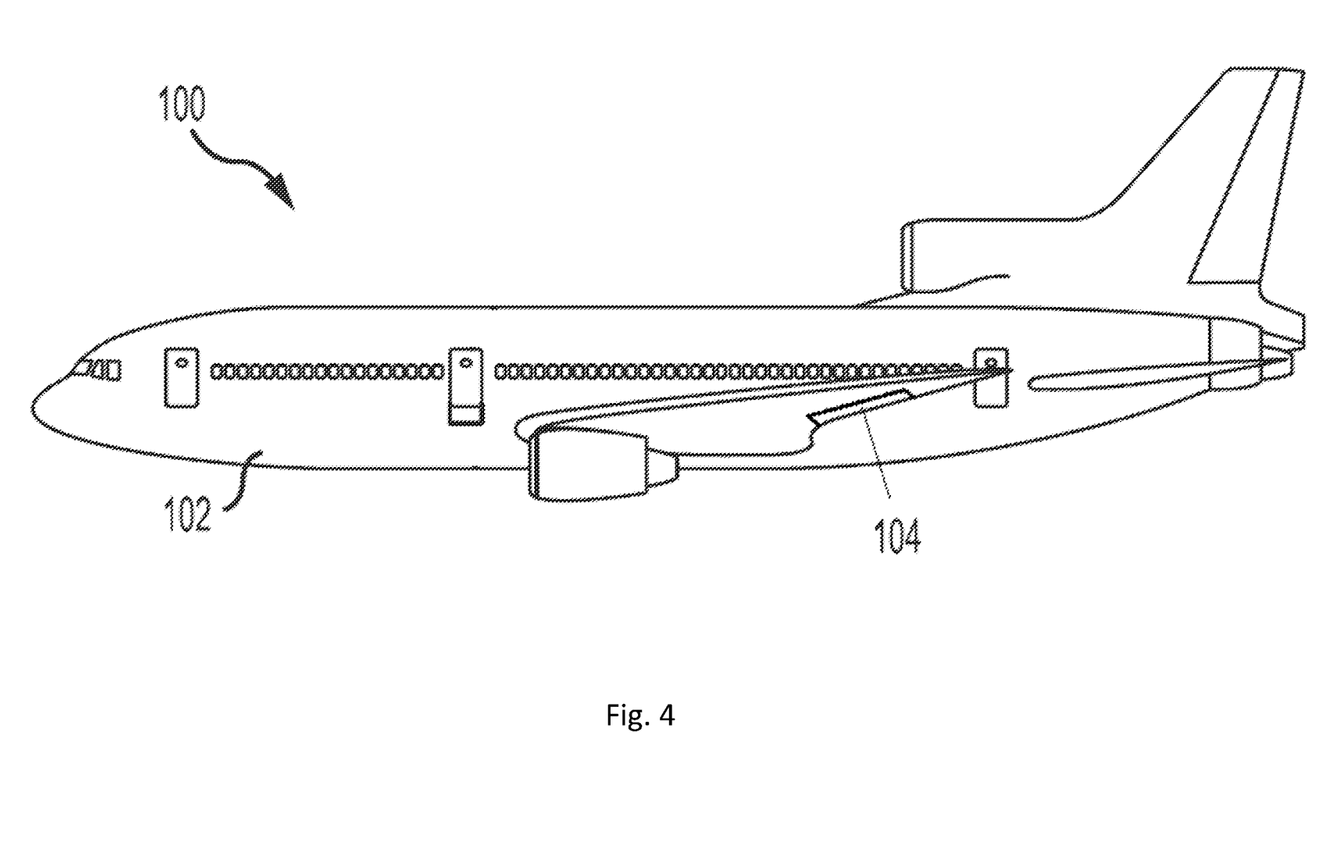
FIG. 4 shows an aircraft.

FIG. 1 shows an actuator 10 having a motor shaft 12 connected to a gearbox 14. The actuator 10 may be a rotary actuator. The motor shaft defines an axis X and the motor shaft 12 is driven by a motor (not shown). Rotation of the motor shaft 12 turns the gears of the gearbox 14. The actuator 10 has connection points 16a,b for connecting the actuator to an aircraft frame 102 of an aircraft 100 (see FIG. 4). Rotation of the motor shaft 12, via the gearbox 14, causes an output 18 to rotate around the axis X. In use, the output 18 connects to a spoiler 104 of the aircraft 100, such that movement of the output 18 causes movement of the spoiler. The actuator 10 has an end stop 20 that limits the range of motion of the output 18 to less than 360 degrees around the axis X.

The motor shaft 12 connects to one side of an electrically-actuated clutch 22 that is controlled by an electromagnet 24, for example a solenoid.

A controller 25 is provided to control actuation of the electromagnet 24 and thereby control whether the clutch 22 is engaged or disengaged. The same controller 25 may also be used to control the actuator 10, shown schematically by dashed-line 23, e.g. to control a motor of the actuator 10 as well as to detect a position of the output 18. The angular position and angular speed of the output 18 may be monitored by the controller 25 or by another controller in a variety of ways, e.g. by a sensor detecting the output 18 or a sensor monitoring the motor shaft 12 or by a sensor monitoring the motor controlling the motor shaft 12.

A first ratchet 26 and a second ratchet 28 are provided on the other side of the electrically-actuated clutch 22, and are connected to the clutch via a shaft 30 having an axis Y. The shaft axis Y may be coaxial with the motor shaft axis X or may be non-coaxial therewith. As described in detail below, the ratchets 26, 28 provide an anti-extension and anti-retraction function for the actuator 10 when they are connected, via the clutch 22 to the motor shaft 12.

The first ratchet 26 comprises a first ratchet wheel 261 mounted for rotation with the shaft 30. The first ratchet wheel 261 has one or more teeth 262 on its outer circumference. A first ratchet pawl 263 is mounted adjacent the teeth 262 and is biased by a spring to bear against the outer circumference of the ratchet wheel 261. When the ratchet wheel 261 rotates in a first direction (which is anticlockwise in the direction shown in FIG. 1), the teeth 262 slide freely under the first ratchet pawl 263. When the first ratchet wheel 261 rotates in a second direction, opposite the first direction (i.e. clockwise in the orientation shown in FIG. 1), one of the teeth will come to bear against the pawl 263 and thereafter further rotation of the ratchet wheel 261 in that direction will be prevented.

The second ratchet 28 comprises a second ratchet wheel 281 mounted for rotation with the shaft 30. The second ratchet wheel 281 has one or more teeth 282 on its outer circumference. A second ratchet pawl 283 is mounted adjacent the teeth 282 and is biased by a spring to bear against the outer circumference of the second ratchet wheel 281. The second ratchet 28 is oriented in the opposite direction from the first ratchet wheel. That is, when the second ratchet wheel 281 rotates in the second direction (which is clockwise in the direction shown in FIG. 1), the teeth 282 slide freely under the second ratchet pawl 283. When the second ratchet wheel rotates in the first direction (i.e. anticlockwise in the orientation shown in FIG. 1), one of the teeth 283 will come to bear against the pawl 283 and further rotation of the second ratchet wheel 261 in that direction will be prevented.

A first cam surface 264 is connected for rotation with the output 18. The first cam surface 264 is adjacent the first ratchet 26 and is shaped such that, within a first predetermined range of angular positions of the output 18, the first cam surface 264 pushes the first ratchet pawl 262 away from engagement with the first ratchet wheel 261. The first cam surface 264 is further shaped such that at other positions, i.e. at angular positions of the output 18 outside the first predetermined range, the first ratchet pawl 263 is left free to abut against the first ratchet wheel 261. Put another way, the first cam surface disengages the first ratchet 26 when the output 18 (which is connected to the first and second cam surfaces) is within the first predetermined angular range.

A second cam surface 284 is also connected for rotation with the output 18. The second cam surface 264 is adjacent the second ratchet 28 and is shaped such that, within a second predetermined range of angular positions of the output 18, the second cam surface 284 pushes the second ratchet pawl 282 away from engagement with the second ratchet wheel 281. The second cam surface 284 is further shaped such that at other positions, at positions of the output 18 outside the second predetermined range, the second ratchet pawl 283 is left free to abut against the second ratchet wheel 281. Put another way, the second cam surface 284 disengages the second ratchet 28 when the output (which is connected to the first and second cam surfaces) is within the second predetermined angular range.

Typically, the first predetermined range will be different from the second predetermined range, e.g. as shown below in relation to FIGS. 2A-C.

During normal operation of the actuator 10, the clutch 22 is disengaged and the two ratchets 26, 28 are not connected for rotation with the motor shaft 12. As such, the actuator 10 may drive the output 18 in either direction of rotation about the axis X.

When the clutch 22 is engaged, the motor shaft 12 is connected for rotation with the shaft 30 that connects to both ratchet wheels 261, 281. As such, the ratchet wheels 261, 281 will attempt to rotate with the motor shaft 12. Depending on the current position of the output 18 (and therefore the current positions of the first and second cam surfaces 264, 284) when the clutch 22 is engaged, rotation of the motor shaft 12 may or may not be arrested by the ratchets 26, 28.

In the orientation shown in FIG. 1, the shaft 30 is free to rotate clockwise while the first cam surface 264 is within the first predetermined range. This is because the second ratchet wheel 281 is always free to rotate in the clockwise direction (due to the orientation of its one or more teeth 282 relative to the its pawl 283), and the first ratchet wheel 261 is free to rotate because the first ratchet pawl 263 is currently disengaged from the first ratchet wheel 261 by the first cam surface 264. When the output 18 moves out of the first predetermined range, however, the first ratchet pawl 263 is allowed to re-engage with the first ratchet wheel 261, under the bias from the spring, and will quickly arrest further rotation of the first ratchet wheel 261 by engaging with one of the teeth 262.

Similarly, in the orientation shown in FIG. 1, the shaft 30 is free to rotate anticlockwise while the second cam surface 284 is within the second predetermined range. This is because the first ratchet wheel 281 is always free to rotate in the anticlockwise direction (due to the orientation of its teeth 262 relative to its pawl 263) and the second ratchet wheel 281 is free to rotate because the second ratchet pawl 283 is currently disengaged from the second ratchet wheel 281 by the second cam surface 264. When the output 18 moves out of the second predetermined range, however, the second ratchet pawl 283 is allowed to re-engage with the second ratchet wheel 281, under bias from the spring, and will quickly arrest further rotation of the second ratchet wheel 281 by engaging with one of the teeth 282.

While the output 18 is in a position that is outside both the first and second predetermined ranges, the ratchets 26, 28 will together prevent rotation of the shaft 30 in either direction. That is to say, in the orientation shown, the first ratchet 26 will prevent clockwise rotation of the shaft 30 and the second ratchet 28 will prevent anticlockwise rotation of the shaft 30.

Figure 2A:
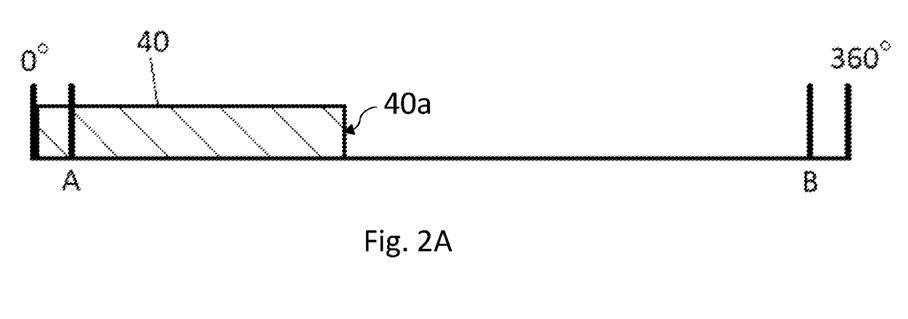
FIG. 2A shows a clockwise operational stroke of the output.
Figure 2B:
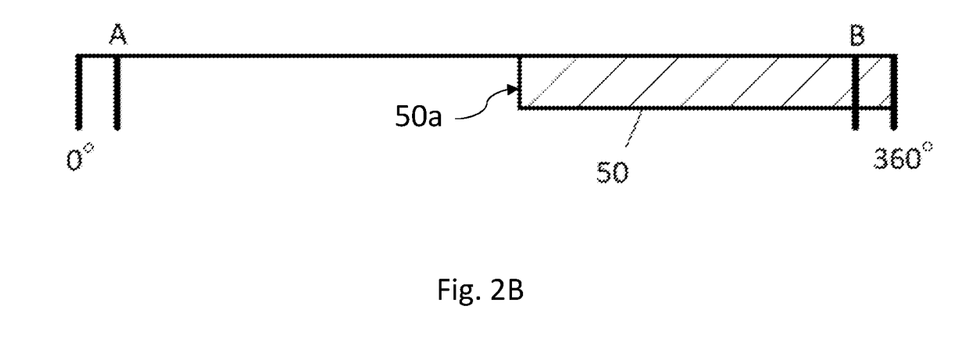
FIG. 2B shows an anticlockwise operational stroke of the output.

FIGS. 2A and 2B respectively depict the first and second predetermined angular ranges. The skilled reader will appreciate that, in some implementations the particular arrangement of e.g. the gearbox 14 and/or the clutch 22 might mean that a clockwise rotation of the motor shaft 12 actually leads to anticlockwise rotation of either or both of the shaft 30 and/or output 18. However, for the sake of clarity, it is assumed in the following discussion that clockwise rotation of the motor shaft 12 results in clockwise rotation of the shaft 30 (when connected via the clutch 22) and results in clockwise rotation of the output 18, where all such directions are in the orientation shown in FIG. 1.

FIG. 2A shows the entire mechanical stroke of the output 18, between 0° and 360°, with zero degrees indicating a center point of the end stop 20. As the end stop 20 has some angular width, the total operational stroke available to the output 18 is less than the full 360 degrees and this range is depicted by lines A and B which define the first and second ends of the operational stroke. Linking this diagram to FIG. 1, movement to the right (e.g. moving from a position at 10 degrees from the end stop to 50 degrees from the end stop) in FIG. 2A corresponds to clockwise rotation of the shaft 30 in the orientation shown in FIG. 1 (and consequently, as discussed in the preceding paragraph, clockwise rotation of the output 18). FIG. 2A shows only the clockwise movement of the output 18—anticlockwise motion of the output 18 is shown in FIG. 2B and discussed below.

The shaded box 40 indicates the first predetermined range defined by the first cam surface 264, which is connected for rotation with the output 18, and thus the angular position of the output 18 may be considered to be identical to the angular position of the first cam surface 264 and, indeed, with the second cam surface 284. While the first cam surface 264 is anywhere within the range depicted by box 40, the first cam surface 264 is holding the first ratchet pawl 263 away from the first ratchet wheel 261, which means the shaft 30 is free to rotate clockwise and anticlockwise. The end 40a of the box 40 that is between points A and B is the first intermediate position.

When the first cam surface 264 and output 18 are at an angular position outside the box 40 of FIG. 2, the shaft 30 is no longer free to rotate clockwise because the first ratchet pawl 263 now engages the teeth 262 of the first ratchet wheel 261. In this region, if the shaft 30 is connected to the motor shaft 12 via the clutch 22, then the motor shaft 12 is also prevented from clockwise rotation. That is, the motor shaft 12 is braked against clockwise rotation. This means that when the clutch 22 is engaged, the output may be moved clockwise only within the region defined by box 40.

FIG. 2B, similar to FIG. 2A, shows the entire mechanical stroke of the output 18, between 0° and 360°, with zero degrees indicating a center point of the end stop 20. FIG. 2B depicts only the anticlockwise movement of the output 18. FIG. 2B also shows a box 50 depicting the angular range of the second cam surface 284, within which range the second cam surface 284 holds the second ratchet pawl 283 away from the second ratchet wheel 281. The end 50a of box 50 between points A and B is the second intermediate point. As such, when the output 18 is at an angular position within box 50, the shaft 30 may be rotated anticlockwise, which is movement to the left in FIG. 2B. When the output 18 and, correspondingly, the second cam surface 284 reaches the edge of the box 50, further anticlockwise rotation of the shaft 30 is prevented by the second ratchet 28. In this region, if the shaft 30 is connected to the motor shaft 12 via the clutch 22, then the motor shaft 12 is prevented from anticlockwise rotation when the output 18 is outside box 50. That is, the motor shaft 12 is braked against anticlockwise rotation.

Figure 2C:
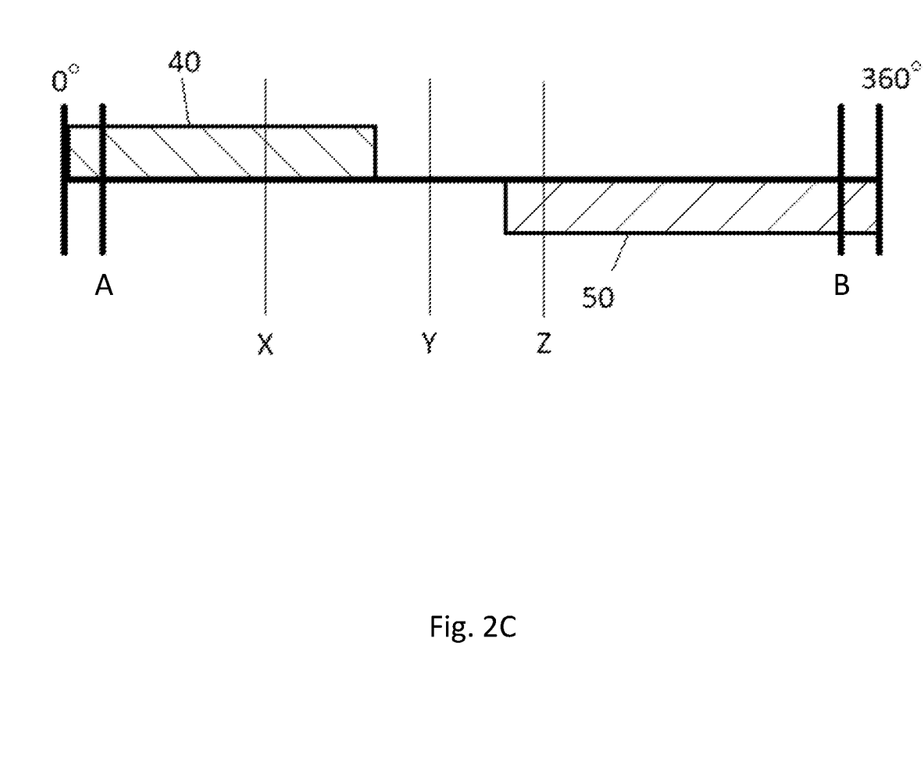
FIG. 2C shows both clockwise and anticlockwise strokes of the output.

FIG. 2C shows FIGS. 2A and 2B put together. Thus, when considering clockwise rotation of the output 18, one must refer to the upper half of the diagram (i.e. corresponding to FIG. 2A) and when considering anticlockwise rotation of the output 18, one must refer to the lower half of the diagram (i.e. corresponding to FIG. 2B).

If the output 18 is at angular position X when the clutch 22 is engaged, then due to the position of the first cam surface 264, the output 18 may move clockwise (i.e. to the right) up to the end of box 40, but no further. The output 18 is also prevented from moving anticlockwise (i.e. to the left) by the second ratchet 28.

The first and second predetermined ranges (shown as boxes 40 and 50) in FIG. 2C are non-overlapping. This means that, if the output is at position Y, between the first and second intermediate points, when the clutch 22 is engaged, then neither cam surface 264, 284 is holding a respective pawl 263, 283 away from a respective ratchet wheel 261, 281, and therefore movement of the output 18 in either direction is prevented. That is, in this region between boxes 40 and 50, the first ratchet 26 prevents clockwise rotation of the shaft 30 and the second ratchet 28 prevents anticlockwise rotation of the shaft 30. As such, the output is held in place at position Y unable to move while the clutch 22 is engaged.

If the output is at position Z when the clutch 22 is engaged, the second cam surface 284 is holding the second ratchet pawl 283 away from the second ratchet wheel 281 and therefore the output may be moved anticlockwise (i.e. to the left) up to the end of box 50, but no further. The output is also prevented from moving clockwise (i.e. to the right) by the first ratchet 26.

Thus, depending on the angular position of the output 18 when the clutch 22 is engaged, the output 18 may be free to move towards a more-central position within the diagram, or, if it is already near a central position (i.e. between the two boxes 40, 50), it may be locked in place.

When the actuator 10 is installed for use in an aircraft, the output 18 is connected to a spoiler of the aircraft (in other uses, the actuator may be connected to a flap, slat or flight surface etc.). The actuator will typically be arranged such that a given angular position of the output 18 that is somewhere between the ends of the operational stroke corresponds to a neutral position of the spoiler. This means the actuator 10 can move the spoiler in either direction away from the neutral position. For the sake of simplicity, the following discussion will assume that this neutral position is point Y in FIG. 2C, but it could be other places between the ends A,B of the operational stroke too. In such a setup of the aircraft, clockwise movement of the output 18 may correspond to an upward movement of the spoiler while anticlockwise movement corresponds to a downward movement of the spoiler. Taking point Y as the neutral position, point X, being to the left of point Y, corresponds to a spoiler-up position, and point Z corresponds to a spoiler-down position.

When the clutch 22 is engaged, the above-discussed arrangement of ratchets 26, 28 and respective cam surfaces 264, 284, means that if the output 18 is at point X and the spoiler is up, the spoiler can be returned at least partially towards the neutral position. That is the output 18 may be rotated clockwise, which shows as rightward movement, up to the end of box 40. However, while the clutch 22 is engaged, the spoiler cannot be moved further up from its current position. The ratchets 26, 28 therefore act here as an anti-extension device, i.e. disallowing further upward movement of the spoiler, by preventing anticlockwise movement of the output 18.

Similarly, when the clutch 22 is engaged, the above-discussed arrangement means that if the output is at point Z in FIG. 3C, and the spoiler is therefore down, the spoiler can be returned at least partially up towards the neutral position. That is, the output 18 may be rotated anticlockwise up to the end of the box 50. The ratchets 26, 28 therefore act here as an anti-retraction device by disallowing further downward movement of the spoiler, by preventing clockwise movement of the output 18.

If the clutch is engaged while the output 18 is at point Y or at any point within the angular region between the ends of boxes 40 and 50, then the ratchets 26, 28 act to prevent rotation of the output in either direction, and therefore act to fully lock the output 18 in its current position.

The reader will therefore appreciate that if the output starts at point X when the clutch is engaged, and is returned partially towards the neutral position, i.e. to the end of the box 40, the spoiler is then locked in place by the ratchets 26, 28 at that point. Similarly, if the output 18 starts at point Z when the clutch is engaged and is returned partially towards the neutral position, i.e. to the end of box 50, the spoiler is then locked in place by the ratchets 26, 28 at that point.

It is common to have large gear ratios in the gearbox 14, such that many turns of the motor shaft 12 correspond to only a partial rotation of the output 18. Common gear ratios may be 300:1 or 500:1, for example.

The skilled reader will appreciate that when a ratchet pawl is allowed to engage its ratchet wheel, it will only arrest rotation of the ratchet wheel once it comes into abutment with a tooth on the wheel. Thus, there is typically some small angular range of rotation of the ratchet wheel that is allowed before further rotation is arrested by the pawl—the small angular range being defined by the number and spacing of the teeth on the ratchet wheel and where these are in relation to the pawl when it first engages the wheel. However, with the aforesaid gear ratios, a full turn of the motor shaft may correspond to only a very small angular change in the position of the output 18. Thus, when the clutch 22 engages, the rotation of the output 18 may be arrested by the ratchets essentially instantly, i.e. within a very small angular range of movement of the output 18.

Providing the ratchets 26, 28 to brake the motor shaft 12 allows for the use of a smaller end stop 20. It is much easier to prevent rotation of the motor shaft 12, using the ratchets 26, 28 (i.e. lower forces involved), compared to relying on the end stop 22 to prevent movement of the output 18. For an electromechanical actuator, the inertia of the actuator is mainly determined by the inertia of the motor. The inertia at the output 18 is equal to motor inertia x gear ratio$^2$. Therefore, with a large gear ratio, a small motor inertia gives high inertia at gearbox output. Designing an end stop 20 able to stop such high inertia may require heavy parts. By contrast, providing the present ratchets 26, 28 to stop motion of the motor shaft 12 may allow the use of lighter and/or smaller components to brake the actuator in the event of runaway, and reduce the overall actuator weight.

The angular position and angular speed of the output 18 may be monitored in a variety of ways, e.g. by a sensor detecting the output 18 or a sensor monitoring the motor shaft 12 or monitored by the motor controlling the motor shaft 12. Runaway may be defined as any situation where movement of the output 18 is not fully controlled by the motor or is inaccurately controlled by the motor e.g. due to inaccurate or delayed information from the position sensor. When runaway is detected, the clutch 22 may be engaged to connect the ratchets 26, 28 to the motor shaft 12. This engages the above-discussed anti-extension/anti-retraction functionality of the actuator 10. As such, if the output 18 is currently an angular position in either box 40 or box 50 of FIG. 3C, further movement towards the end of the operational stroke is arrested. While the clutch 22 remains engaged, movement of the output 18/spoiler partially back towards the neutral position is allowed, as described above.

Figure 3:
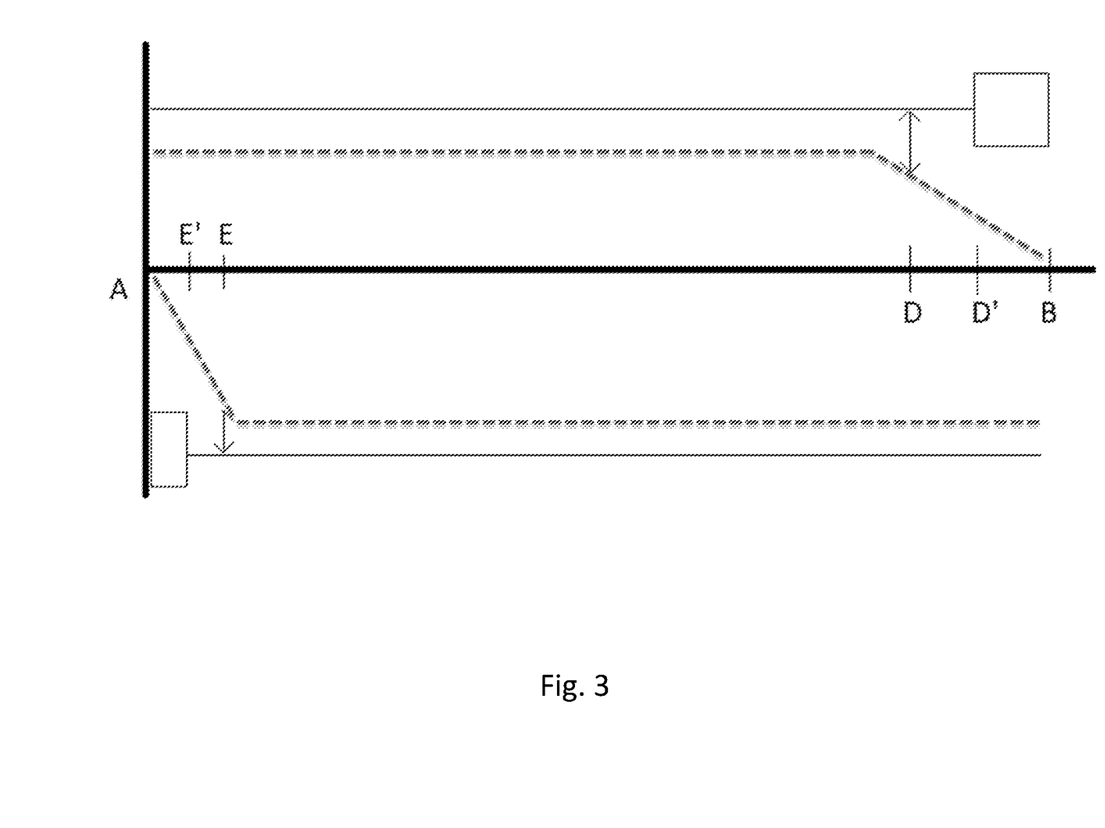
FIG. 3 shows an output speed graph.

FIG. 3 shows a diagram of an example movement of the output 18 in a clockwise direction (upper half of the diagram) and an example movement of the output 18 in an anticlockwise direction (lower half of the diagram).

Considering first the upper half, the dashed line depicts a speed order, wherein the controller 25 orders the actuator to move the output 18 clockwise at 100 degrees per second, and to slow the output 18 down as it nears the end of the operational stroke at point B, which is the same as point B in FIGS. 2A-C. The solid line depicts the actual speed of the output 18, i.e. as measured by the controller 25 from a sensor. In this example, the output 18 is being helped to move clockwise by aerodynamic forces on the spoiler that is controlled by the actuator 10. Thus, the actual speed of the output 18 is, in this example, 120 degrees per second. This difference in speeds may be acceptable when the output 18 is moving faster than the ordered speed by only a predetermined amount. However, at point D, the gap between the ordered speed and the actual speed increases beyond the predetermined amount. The controller 25 determines from this that runaway is occurring, i.e. movement of the output is no longer under its control. In response, the controller 25 may energize the electromagnet 24 so as to engage the clutch 22. There may be a brief delay for the electronic signaling (which corresponds to some further angular movement of the output 18 from D to D'), and then the ratchets 26, 28 take effect to brake further movement of the output 18. The ratchets then have the space between D' and B to fully brake the output 18 without the output 18 contacting the end stop 22.

Considering the lower half of the figure, the dashed line depicts a speed order, wherein the controller 25 orders the actuator to move the output anticlockwise at 100 degrees per second, and to slow the output down as it nears the end of the operational stroke. The solid line depicts the actual speed of the output 18, i.e. as measured by the controller from a sensor. In this example, the output 18 is being helped to move anticlockwise by aerodynamic forces on the spoiler controlled by the actuator 10. Thus, the actual speed of the output 18 is, in this example, 110 degrees per second. As before, this difference in speeds may be acceptable when the output 18 is moving faster than the ordered speed by only a predetermined amount. However, at point E, the gap between the ordered speed and the actual speed increases beyond the predetermined amount. The controller 25 determines from this that runaway is occurring, i.e. movement of the output 18 is no longer under its control. In response, the controller 25 may energize the electromagnet 24 so as to engage the clutch 22. There may be a brief delay for the electronic signaling (which corresponds to some further angular movement of the output 18 between points E and E'), and then the ratchets 26, 28 take effect to brake further movement of the output 18. The ratchets then have the space between E' and A to fully brake the output without the output 18 contacting the end stop 22.

Figure 5:
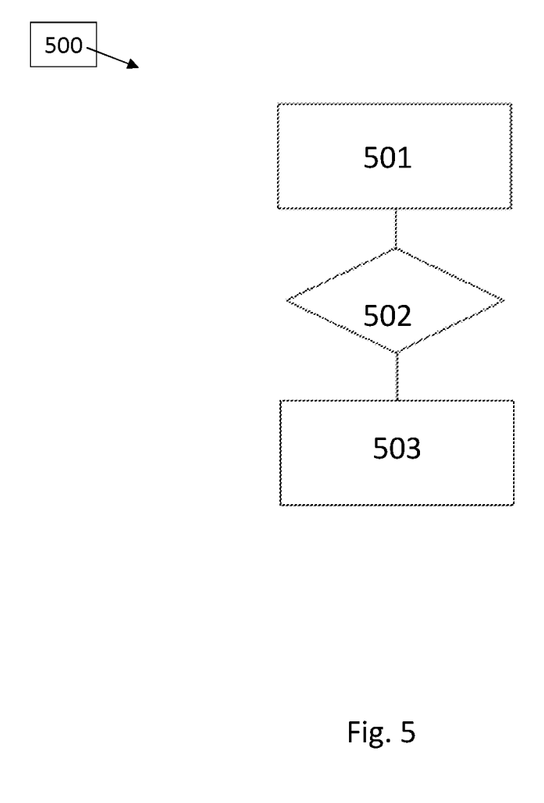
FIG. 5 shows a method of using the actuator.

FIG. 5 shows a flowchart of a method 500 of using the actuator 10. The method starts at a step 501 of detecting a speed of the output 18. At step 502, a determination is made (e.g. by the controller 25 or by another aircraft controller) whether the speed of the output is greater than an ordered speed (e.g. as ordered by the controller or other aircraft controller) by more than a predetermined amount. If the determination is "yes", the method proceeds to step 503 where the electrically-actuated clutch 22 is engaged, so as to connect the shaft 30 to the motor shaft 12.

The device described hereinabove functions as an actuator brake that may be selectively engaged when runaway is detected. The skilled reader will appreciate that the arrangement of ratchets 26, 28 and cam surfaces 264 and 284 cannot function as a no-back device which devices are commonly used on screw actuators and ball-screw actuators in aircraft. In screw and ballscrew actuators, an output shaft rotates many times around its axis to move a nut axially along the output shaft, where axial movement of the nut moves a flap, slat, spoiler or flight surface of the aircraft. A no-back device is commonly provided on such screw/ballscrew actuators in which a flange of the output shaft is situated between first and second ratchets, the first and second ratchets having opposed allowed-rotation directions. When feedback forces load the nut axially in compression along the output shaft axis, which induces, say, clockwise torque on the output shaft, the flange is compressed against the first ratchet of the no-back device while the output shaft remains in compression and friction between flange and ratchet prevent clockwise motion of the output shaft. Similarly, when the feedback forces load the nut in tension along the output shaft axis, which, in this example, causes anti-clockwise torque on the output shaft, the flange is pulled by the tension to load against a second ratchet and friction between the flange and second ratchet prevents anti-clockwise motion of the output shaft while the output shaft remains in tension. By contrast, the present arrangement, in particular the cam surfaces, work with an output that moves through an angular range of less than 360 degrees. As described above, the cam surfaces intentionally disengage the ratchet pawls 263, 283 from their respective ratchet wheels 261, 281 at specific angular positions of the output. Such a setup would be unsuitable for use as a no-back device connected to the output shaft of a screw/ballscrew actuator, as it would periodically disengage the no-back functionality while the output shaft rotates multiple times about its axis to move the nut axially.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. An actuator comprising:
a motor shaft having an axis (X),
an output arranged to rotate within an angular range of less than 360 degrees, wherein rotation of the motor shaft about the axis drives the output in rotation,
a first ratchet comprising a first ratchet wheel and a first ratchet pawl, the first ratchet arranged such that, while the first ratchet pawl engages the first ratchet wheel, the first ratchet wheel is freely rotatable in a first direction and prevented from rotation in a second direction, opposite the first direction;
a second ratchet comprising a second ratchet wheel and a second ratchet pawl, the second ratchet arranged such that, while the second ratchet pawl engages the second ratchet wheel, the second ratchet wheel is freely rotatable in the second direction and prevented from rotation in the first direction;
wherein the first and second ratchet wheels are mounted to a ratchet wheel shaft;
a first cam surface connected to rotate with the output, wherein the first cam surface is arranged to disengage the first ratchet pawl from the first ratchet wheel when the output is within a first predetermined angular range, and to allow the first ratchet pawl to engage with the first ratchet wheel when the output is outside the first predetermined angular range;
a second cam surface connected to rotate with the output, wherein the second cam surface is arranged to disengage the second ratchet pawl from the second ratchet wheel when the output is within a second predetermined angular range, and to allow the second pawl to engage with the second ratchet wheel when the output is outside the second predetermined angular range; and
an electrically-actuated clutch arranged to selectively connect the ratchet wheel shaft to the motor shaft.

2. The actuator according to claim 1, wherein the motor shaft is connected to the output via a gearbox.

3. The actuator according to claim 1, comprising a controller operable to order the output for rotation, and operable to control the electrically-actuated clutch, wherein the controller is configured to:
- detect a rotational speed of the output, and to
- engage the clutch to connect the ratchet wheel shaft to the motor shaft if the detected rotation speed of the output is greater than an ordered rotational speed of the output by more than a predetermined amount.

4. The actuator according to claim 1, comprising an electromagnet, wherein the controller is configured to control electrical power to the electromagnet in order to control the electrically-actuated clutch.

5. The actuator according to claim 1, wherein the ratchet wheel shaft and the motor shaft are coaxial with one another.

6. The actuator according to claim 1, comprising an end stop, wherein the end stop defines a first end and a second end of the angular range of the output.

7. The actuator according to claim 6, wherein the first predetermined range extends from a position where the output is in contact with the end stop at the first end of the angular range of the output, and extends to a first intermediate position of the output between the first and second ends of the angular range.

8. The actuator according to claim 7, wherein the second predetermined range extends from a position where the output is in contact with the end stop at the second end of the angular range of the output, and extends to a second intermediate position of the output between the first and second ends of the angular range.

9. The actuator according to claim 8, wherein the cam surfaces are arranged such that, when the output is at an angular position between the first and second intermediate positions, the first ratchet pawl engages the first ratchet wheel and second ratchet pawl engages the second ratchet wheel.

10. An aircraft comprising:
- an airframe;
- a spoiler movably mounted to the airframe; and
- the actuator according to claim 1 mounted to the airframe, wherein the output is connected to the spoiler to control a position of the spoiler relative to the airframe.

11. A method of controlling the actuator according to claim 1, the method comprising
- detecting a speed of the output;
- determining whether the speed of the output is greater than an ordered speed by more than a predetermined amount; and
- actuating the electrically-actuated clutch to connect the ratchet wheel shaft to the motor shaft when the speed of the output is greater than an ordered speed.

* * * * *